DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 22, 1971

887 O.G. 1048

T887,030

OPTICAL BRIGHTENING COMPOSITIONS

John Albert Ford, Jr., and John Frederick Stenberg, both % Eastman Kodak Co., Kodak Park Division, Rochester, N.Y. 14650

Filed Sept. 11, 1970, Ser. No. 71,409

**Int. Cl. G03c *1/92***

U.S. Cl. 96—82

No Drawing. 18 Pages Specification

This invention relates to an optically brightened material comprising an organic material to be brightened and at least one brightening agent which is a N-arylphthalimidine. Illustrative phthalimidines employed can be represented by the structural formulas:

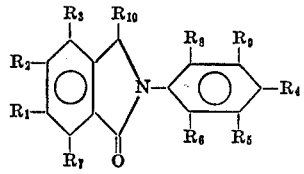

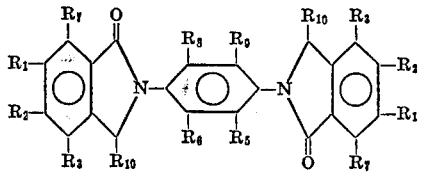

and

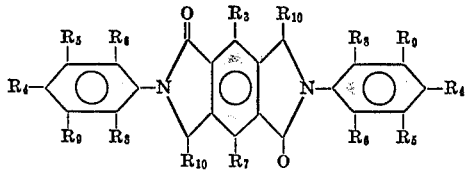

wherein each of $R_1$ through $R_{10}$ can be: hydrogen; alkyl, including substituted alkyl; aryl, including substituted aryl; halo; cyano; and the like; with the limitation that said substituents be free of any functional groups which evolve gas in the Zerwitinoff test for active hydrogen.

In a preferred embodiment of the invention, the alkyl and aryl groups can have from 1 to about 12 carbon atoms.